United States Patent
Tanaka

(10) Patent No.: US 6,711,697 B1
(45) Date of Patent: Mar. 23, 2004

(54) DATA TRANSFER METHOD

(75) Inventor: Toshimasa Tanaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 582 days.

(21) Appl. No.: 09/696,891

(22) Filed: Oct. 26, 2000

(30) Foreign Application Priority Data

Oct. 29, 1999 (JP) .......................................... 11-308348

(51) Int. Cl.$^7$ .............................................. G06F 13/38
(52) U.S. Cl. ..................................... 713/600; 713/400
(58) Field of Search ................................ 713/400, 600; 709/212; 398/98

(56) References Cited

U.S. PATENT DOCUMENTS

| | | | | | |
|---|---|---|---|---|---|
| 4,890,222 A | * | 12/1989 | Kirk | ............................ | 713/400 |
| 5,406,403 A | * | 4/1995 | Griffin et al. | .................. | 398/98 |
| 5,530,676 A | * | 6/1996 | Sullivan et al. | .............. | 365/227 |
| 5,535,333 A | * | 7/1996 | Allen et al. | .................. | 709/212 |
| 5,826,068 A | * | 10/1998 | Gates | ........................... | 713/600 |
| 6,081,656 A | * | 6/2000 | Witt | ................................ | 716/3 |

FOREIGN PATENT DOCUMENTS

| | | | | | |
|---|---|---|---|---|---|
| EP | | 275411 A | * 7/1988 | ............ | G06F/11/10 |
| EP | | 883066 A2 | * 12/1998 | ............ | G06F/13/42 |

OTHER PUBLICATIONS

Xilinx, IIC Bus Interface Design Specification, Dec. 20, 2001.*

* cited by examiner

Primary Examiner—Thomas Lee
Assistant Examiner—Mark Connolly
(74) Attorney, Agent, or Firm—Hogan & Hartson

(57) ABSTRACT

A serial data transfer method utilizing one clock line and one serial data line. The method transfers a sequence of serial data bits on the serial data line, with each bit synchronized with a rise of a clock signal on the clock line. A chip enablement signal is placed within a particular data bit in synchronism with a particular fall of the clock signal associated with the particular data bit to determine the range of the serial data based on the bit position of the chip enablement signal. A further data identification flag bit is placed in the data bit that follows the chip enablement signal to indicate whether the serial data constitute a command code or write data. Thus, the data transfer method of the invention provides a simple and efficient serial data transfer method by minimizing control bits in accordance with the invention, using only two signal lines as in IIC data transfer methods.

4 Claims, 4 Drawing Sheets

DATA TRANSFER METHOD

FIELD OF THE INVENTION

The invention relates to a method of transferring serial data having a predetermined data length between a control device such as a CPU and a device such as a semiconductor IC to be controlled by the control device.

BACKGROUND OF THE INVENTION

A serial interface method is normally used in transferring predetermined data between a control device such as a CPU and a peripheral device such as an IC.

A typical serial interface method uses three data lines, including a data line SI for sending the serial data, a clock (CK) line, and a chip enablement (CE) line. Furthermore, if it is necessary, for example, to control 8-bit data as it is, an extra signal line for a data identification flag is needed to distinguish write data from command codes. Therefore, in total four lines are needed.

A serial data transfer method, called Inter Integrated Circuit (IIC) bus system, using only two data lines is also known in the art. In the IIC bus system, a master device and a multiplicity of IIC bus slave devices are connected via an IIC bus for exchange of address signals and data signals.

FIG. 1 shows a data format for use in an IIC bus system. As an example, in recording data in a predetermined IIC bus slave device via the IIC bus, the IIC bus master device raised a clock signal SCL to a HIGH level, while pulling data and address signals (SDA) from a HIGH to a LOW level. This establishes satisfactory conditions for data transfer, so that the bus master device sends an 8-bit address signal (A7–A1, R/W) to the IIC bus slave device. The eighth bit of the address signal (which corresponds to A0 bit) is reserved for a read/write (R/W) bit which specifies a read or a write operation.

The IIC bus slave device addressed by the address signal returns an acknowledgment (ACK) signal to the IIC bus master device by lowering the SDA signal to the LOW level in the next clock subsequent to the eighth bit. Thus, the bus master device confirms that the IIC bus slave device is in the normal operating condition.

Upon receipt of the ACK signal, the IIC bus master device sends an 8-bit SDA data signal in synchronism with the clock signal SCL, which data signal is received and stored by the addressed IIC bus slave device. Upon receiving the data correctly, the addressed IIC bus slave device renders the SDA signal LOW, and returns an acknowledgment signal ACK. The IIC bus master device, upon receipt of the acknowledgment signal ACK, pulls up the SDA signals from the LOW to the HIGH level while the clock signal SCL is HIGH and ends the bussing operation.

Thus, in the IIC bus system, data transfer can be performed between a IIC bus master device and an arbitrary IIC bus slave device connected with the bus master device by means of two data transfer lines.

However, although such a conventional IIC bus system as mentioned above can transfer data using only two data lines, it require transfer of data amounting to a total of 18 bits in sending 8-bit data, including 7 bits slave device address and further bits for a R/W signal and an acknowledgment signal ACK, as shown in FIG. 1. Moreover, in a case where a further signal must be included to indicate whether the serial data are data to be written in a device (referred to as write data) or a command code, additional 8 bits for the signal and a 1 acknowledgment bit, amounting to a total of 9 bits in a standard 8 bit data format, are needed for this purpose.

SUMMARY OF THE INVENTION

It is therefore an object of the invention to provide a simple and efficient data transfer method in which serial data can be transferred, in a reduced data format, between a control device such as a CPU and a device such as a semiconductor IC to be controlled by the control device, using only two signal lines as in IIC data transfer systems.

Thus, in one aspect of the invention, there is provided a serial data transfer method utilizing one clock line and one serial data line, comprising steps of:

transferring a predetermined number of serial data bits on said serial data line, with each bit in synchronism with a rise or a fall of a clock signal on said clock line;

placing a chip enablement signal in synchronism with a particular fall or rise of the clock signal associated with a particular one of said data bits; and determining the range of said serial data based on said chip enablement signal.

It is noted that in transferring serial data from a control device such as a CPU to a slave device such as ICs, the chip enablement signal is placed at a predetermined bit position within the serial data bits, thereby reducing the data length to that of the serial data passed by two signal lines as in conventional IIC data transfer, thereby allowing simple yet efficient data transfer.

A data identification flag to distinguish serial data constituting a command code from serial data constituting write data may also be placed in the data bit that follows the chip enablement signal bit in synchronism with the falling or rising clock signal associated with the data bit.

The chip enablement signal allows determination of the data range of the sequential data. The data identification flag allows to distinguish write data from command codes.

In the data transfer system according to the invention, the above mentioned particular data bit to which said chip enablement signal is associated may be the second bit from the last in the serial data. This assures detection of the chip enablement signal.

The serial data bits may be sequentially read in and stored in registers by shifting the data bits in synchronism with the rising or fall clock signal. The serial data may be retrieved after the predetermined range of data bits are shifted in the registers following the detection of the chip enablement signal.

It should be appreciated that signals received are sequentially shifted in the registers and stored therein without querying whether the signals are valid sequential data or not, and that the serial data are retrieved when its validity is verified, thereby assuring receipt of the serial data by the addressed slave device in a simple and safe manner.

In cases where one-way data transfer is required, serial data transfer method of the invention is particularly useful.

DETAILED DESCRIPTION OF THE PREFERRED EMBODIMENT

Figure 1:
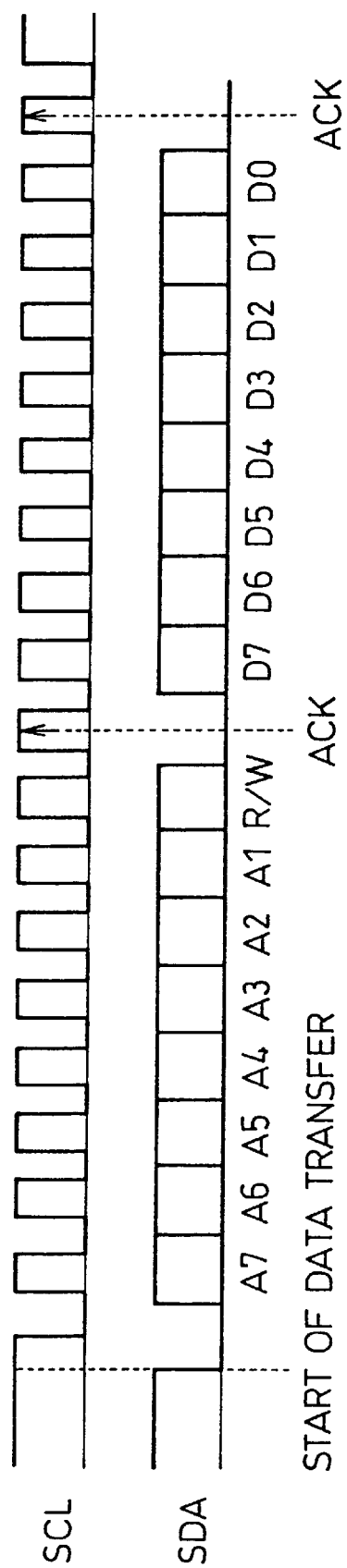
FIG. 1 shows a data format for a conventional IIC bus system.
Figure 2:
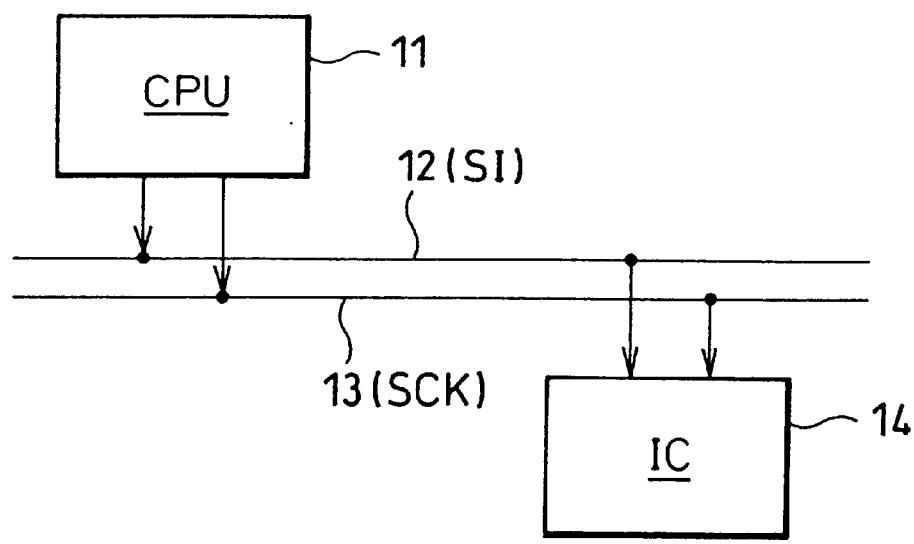
FIG. 2 shows a concept of a data transfer system according to the invention
Figure 3:
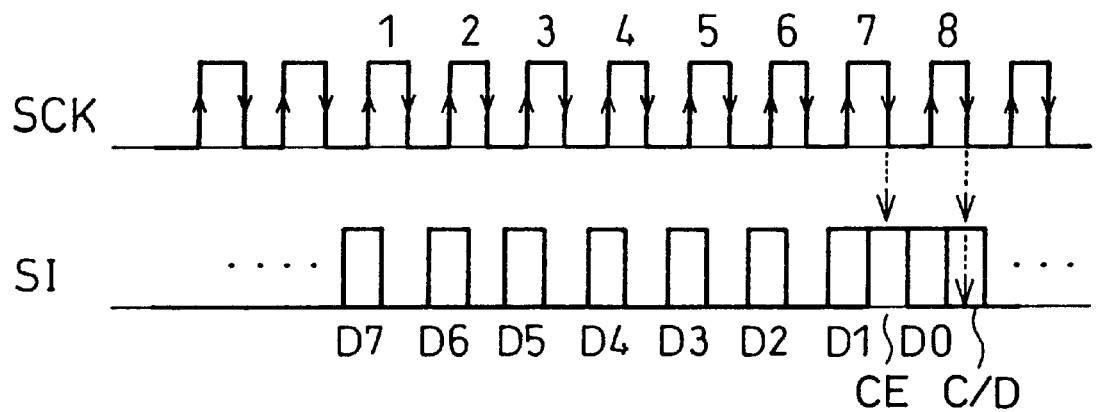
FIG. 3 shows a data format suitable for data transfer according to the invention.

Referring to FIGS. 2 and 3, there is shown a concept of data transfer according to the invention and data format therefor, respectively. Referring to FIG. 2, a CPU 11 serving as a control device supplies serial data SI and serial clock signals SCK to an IC 14 of a peripheral display device, using two serial signal lines 12 and 13. In the example shown herein, the data transfer is performed in one-way, so that the display IC 14 only receives the data.

The data format shown in FIG. 3 is defined in terms of serial data SI and serial clock signal SCK.

In the example shown herein, the serial data SI comprises a sequence of 8 data bits D7 through D0. Each bit of the data D7–D0 is placed in a first half segment of the bit so that it is synchronized to a rising clock signal. It is noted that the level of each bit of the serial data D7–D0 is LOW during the second half segment of the bit in correspondence with the fall of the clock signal.

A chip enablement signal CE is provided to determine the data range of the serial data, and a data identification flag C/D is provided to distinguish serial data constituting a command code from serial data constituting write data. The chip enablement signal CE is placed in the second half segment of the seventh bit D1 of the serial data bits D7–D0, while the data identification flag C/D is placed in the second half segment of the eighth bit D0.

The serial data SI, cast in the data format as described above, and the serial clock signal SCK are sent from the CPU 11 to the display IC 14 through the serial signal lines 12 and 13, respectively.

The display IC 14 receives the transferred data as follows.

In synchronism with a rise of the clock signal, the levels (either HIGH or LOW) of each first half segment of the latest bits, where data bits D7–D0 are embedded, is read in registers for at least one data length of the serial data. This causes the read data bits to be shifted through the registers. The level (either HIGH or LOW) of the bit in the second half segment of each data bit of the serial data SI is also read at every fall of the clock signal SCK to find a chip enablement signal CE placed in serial data.

If the level changes from LOW to HIGH during the falling clock SCK, the HIGH level portion of the bit is identified as the chip enablement signal. Since the chip enablement signal CE is placed in the second half segment of the seventh data bit D1, the serial data D7–D0 are identified to be the 7 bits that precedes the CE bit plus a subsequent 1 bit.

Then the status of the data identification flag C/D is checked by determining the level of the data identification flag in the next falling clock signal SCK. If the level is HIGH, the sequence of data D7–D0 is identified as a command code, but otherwise the data are identified as write data (data to be written in the peripheral device).

After the identification of the flag C/D and before the next rise of the clock pulse SCK, the serial data D7–D0 are stored in internal registers of the display IC in accordance with the status of the data identification flag C/D. Then the chip enablement signal CE and the data identification flag C/D are cleared since they have now finished their roles.

Subsequently, similar storage, verification, and retrieval processing of the serial data are performed for the display IC 14 to obtain necessary data.

It is noted that the sequential data bits are not recognized as valid serial data SI unless a chip enablement signal having a HIGH level is detected for the serial data bits during the fall of a certain clock pulse SCK. Invalid bits will not be accepted by the display IC 14.

As describe above, the invention provides the data format in which serial data D7–D0 has a predetermined number of sequential data bits synchronized with the rising edges of the clock signal SCK, and a chip enablement signal CE within the serial data in synchronism with the fall of a clock pulse associated with the data bit D1, the chip enablement signal CE determining the data range of the serial data D7–D0 with reference thereto.

Provided in association with the fall of the clock signal SCK associated with the data bit subsequent to the chip enablement signal CE, is a data identification flag C/D for determining if the serial data D7–D0 is a command code or write data.

Thus, serial data transfer can be accomplished using only one signal line 12 for the serial data SI and another signal line 13 for the clock signal SCK by including a data identification flag C/D within the serial data D7–D0 to determine if the serial data constitute a command code or write data.

Figure 4:
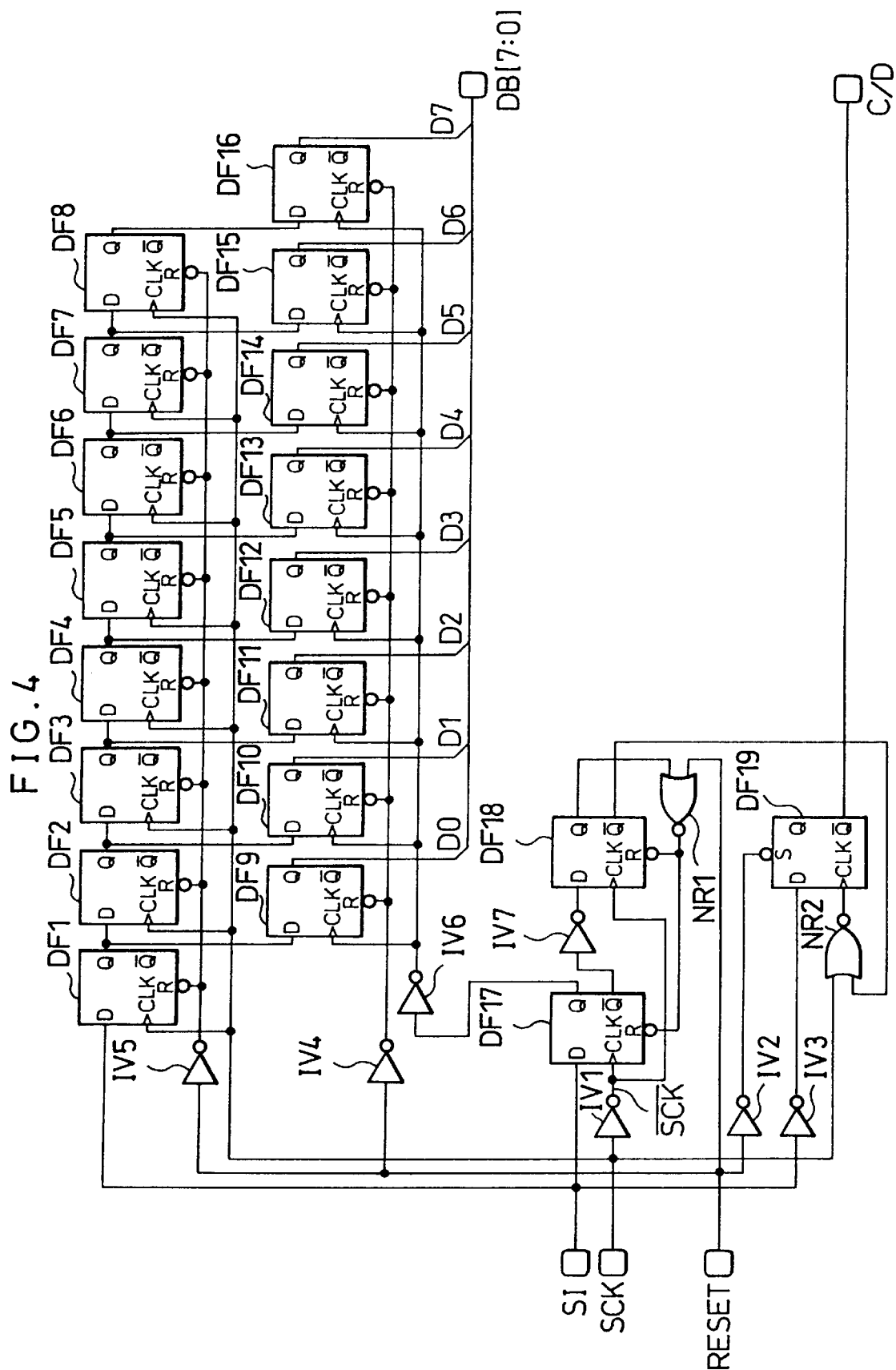
FIG. 4 shows a circuit for use in data transfer according to the invention.
Figure 5:
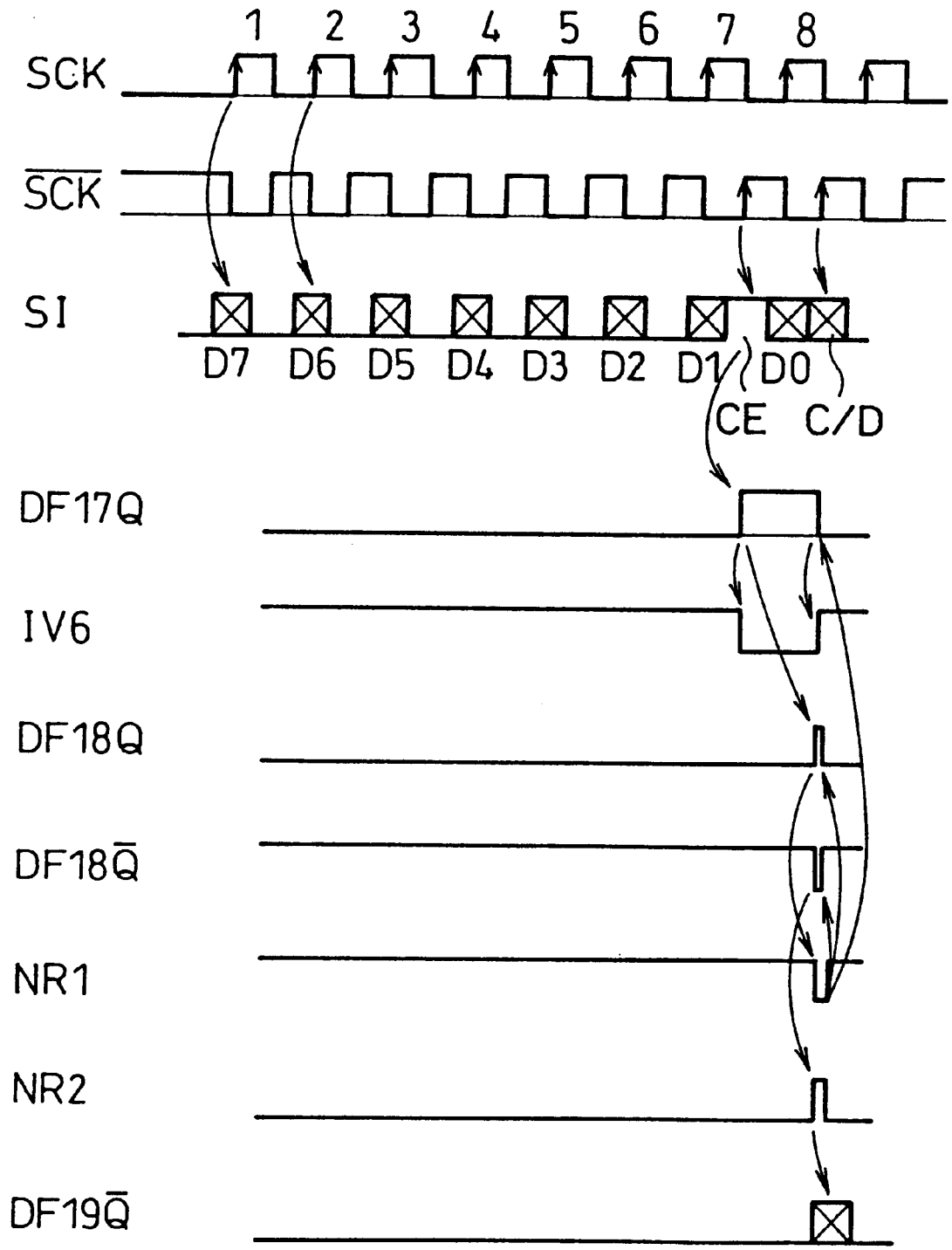
FIG. 5 shows a timing chart for use in data transfer according to the invention.

Referring to FIG. 4, there is shown an exemplary circuit for use in the display IC 14 suitable for receiving serial data in the data format as described above. FIG. 5 is a timing chart for the circuit of FIG. 4. As shown in FIG. 5, the serial data SI and the serial clock signal SCK are placed on the signal lines 12 and 13 by the CPU 11 controlling the circuit.

Coming back to FIG. 4, each of D type flip-flops DF1–DF18, equipped with a reset terminal R, reads data during a rise of clock signal entered to its clock terminal CLK, and is reset by a low level reset signal entered at the reset terminal R. A flip-flop DF19 also has a set terminal S. The flip-flop DF19 reads in data entered at a rise of the clock signal CLK, and is set by a LOW set signal entered at the terminal S. Inverters IV1 through IV7 are provided, coupled with NOR gates NR1 and NR2 as shown. A line RESET is provided in the display IC 14 to supply reset signals as needed by the IC 14.

The serial data transfer method of the invention will now be described by way of example shown in FIGS. 4 and 5.

Entering the system in synchronism with the clock signal SCK, each bit of the serial data SI is sequentially read in the flip-flop DF1 at a rise of the clock signal SCK and is shifted to the further flip-flops at the subsequent rises of the clock signal SCK. The serial data SI are thus read in and shifted through the flip-flops DF1–DF8.

If a data bit of the serial data SI has a LOW level during a rise of inverted serial clock signal $\overline{SCK}$, the Q output of the D type flip-flop DF17 is LOW, the output of the inverter IV6 is HIGH, the output of the inverter IV7 is LOW, the Q output of the D type flip-flop DF18 is LOW, the $\overline{Q}$ output of the D type flip-flop DF18 is HIGH, the output of the NOR gate NR1 is HIGH, and the output of the NOR gate NR2 is LOW.

Consequently, the D type flip-flops such as DF17, DF18, and DF19 will not change their conditions, so that the serial data SI distributed in the first half segments of the data bits are sequentially read in and shifted through the flip-flops DF1–DF8. The data that has passed the last D type flip-flop DF8 will be shifted away to disappear.

After the last data bit D1 of the serial data SI has been read in, if the level of the serial data SI is HIGH at the rise of the next inverted clock signal $\overline{SCK}$, indicating that a chip enablement signal CE exists in the second half segment of the data bit for D1, the D type flip-flop DF17 is inverted, generating a HIGH signal at its Q output terminal and a LOW signal at its $\overline{Q}$ output terminal, while the inverter IV6 pulls its output level from HIGH to LOW. Therefore, the D type flip-flops DF9–DF16 will not read in the data from the flip-flops DF1–DF8, since the former flip-flops are adapted to read the data at the rise of a clock signal CLK.

Subsequently, as the data bit D0 of the serial data SI is read in, the D type flip-flops DF1–DF8 now have the entire serial data D7–D0 registered therein. At the rise of the next inverted serial clock signal $\overline{SCK}$, the $\overline{Q}$ output of the D type flip-flop DF17 is inverted by the inverter IV7, going from LOW to HIGH, which is latched in the D type flip-flop DF18. The flip-flop DF18 then generates a HIGH Q output and a LOW $\overline{Q}$ output.

As the Q output of the D type flip-flop DF18 goes HIGH, a reset signal is supplied via the NOR gate NR1 to the reset terminals R of the D type flip-flops DF17 and DF18 to reset these flip-flops.

Resetting the D type flip-flops DF17 and DF18 causes the inverter IV6 to pull up its output level from LOW to HIGH, which is supplied to the clock terminals of the D type flip-flops DF9–DF16 as a rising signal for them to read in the serial data D7–D0 from the D type flip-flops DF1–DF8.

On the other hand, the LOW $\overline{Q}$ output of the D type flip-flop DF18 and the LOW serial clock signal SCK are supplied to the clock input terminal CLK of the D type flip-flop DF19 via the NOR gate NR2, so that the current condition of the serial data SI, i. e. the status of the data identification flag C/D appearing at the data input terminal D of the flip-flop DF19, is read into the D type flip-flop DF18. As a result, the data identification flag C/D is output from the $\overline{Q}$ output terminal of the D type flip-flop DF18.

The serial data D7–D0 stored in the D type flip-flops DF9–DF16 and the data identification flag C/D stored in the D type flip-flop DF19 are supplied to an appropriate section of the display IC 14.

Subsequently, a reset signal is supplied to the reset terminal RESET prior to the rise of the next serial clock signal SCK, to thereby initializing the circuit and wait for the next serial data.

As described above, the serial data transfer of the invention utilizes two signal lines for supplying a serial clock signal SCK and serial data SI, in which serial data bits D7–D0 are sequentially entered in D type flip-flops DF1–DF8 by reading and shifting the serial data bits in synchronism with rise of the clock signal. A data bit that is HIGH during the fall of the clock signal SCK is identified as a chip enablement signal CE, which is used to determine the data range of the serial data by defining the data bit that precedes the CE bit by 7 bits as the leading data bit D7, and hence identifying the 8 bits that follow the bit D7 as the valid serial data SI.

The level of the data bit subsequent to the chip enablement signal CE during the fall of the next clock signal SCK is regarded as a data identification flag C/D to distinguish serial data D7–D0 constituting a command code from serial data D7–D0 constituting write data, depending on the level (HIGH or LOW) of the data identification flag. Subsequent to the recognition of the data identification flag C/D, the serial data D7–D0 are temporarily stored in internal registers until the next rise of the clock. The chip enablement signal CE and the data identification flag C/D are then cleared.

It will be appreciated that, in accordance with the invention, efficient one-way serial data transfer may be carried out using only two transmission lines, which is faster than conventional IIC bus data transfer. This is the case especially when the serial data constitute write data to a display. For example, in writing in a display panel having 128×128 dots with 8-bit serial data, the inventive serial data transfer requires a total of 16,384 clock pulses. In contrast, a conventional IIC bus data transfer will requires a total of 18,441 clock pulses {7(slave addresses)+1(R/W command)+1 (ACK signal)+2,048×(8(bit per data)+1(ACK signal))}, with neglect of all write commands.

Convention one-way serial data transfer can be controlled by 16,384 clock pulses, provided that four signal lines are available for the data transfer.

It will be apparent to a person of skill that the data length is not limited to 8 bits, but instead it can be of any arbitrary length.

It will be also apparent to a person of skill that, contrary to the example described above, the serial data can be read in at the falling edges of the clock signal SCK and the chip enablement signal and the data identification flag C/D may be obtained at rising edges of the clock pulses SCK.

I claim:

1. A serial data transfer method utilizing a clock line and a serial data line, comprising steps of:

transferring a predetermined number of serial data bits on said serial data line, with each bit in synchronism with a rise or a fall of a clock signal on said clock line;

placing a chip enablement signal in synchronism with a particular fall or rise of the clock signal associated with a particular one of said data bits; and determining the range of said serial data based on said chip enablement signal, wherein said particular one of said data bits, to which said chip enablement signal is associated, is the second bit from the last wherein said serial data bits are sequentially read in and stored by shifting the bits in synchronism with said rise or fall of said clock signal, and wherein after said shifting of said serial data subsequent to the detection of said chip enablement signal, said serial data are retrieved.

2. The serial data transfer method according to claim 1, wherein said data are transferred in one way.

3. A serial data transfer method utilizing a clock line and a serial data line, comprising steps of:

transferring a predetermined number of serial data bits on said serial data line, with each bit in synchronism with a rise or a fall of a clock signal on said clock line;

placing a chip enablement signal in synchronism with a particular fall or rise of the clock signal associated with a particular one of said data bits;

placing a data identification flag in the data bit that follows said chip enablement signal in synchronism with the fall or rise of the clock signal associated with said data bit, said data identification flag to distinguish serial data constituting a command code from serial data constituting write data;

determining the range of said serial data based on said chip enablement signal, wherein said particular one of said data bits, to which said chip enablement signal is associated, is the second bit from the last, wherein said serial data bits are sequentially read in and stored by shifting the bits in synchronism with said rise or fall of said clock signal, wherein after said shifting of serial data subsequent to the detection of said chip enablement signal, said serial data are retrieved.

4. The serial data transfer method according to claim 3, wherein data are transferred in one way.

* * * * *